(12) United States Patent
Kumar

(10) Patent No.: US 10,536,404 B2
(45) Date of Patent: Jan. 14, 2020

(54) USE OF EMAIL TO UPDATE RECORDS STORED IN A DATABASE SERVER

(71) Applicant: Oracle International Corporation, Redwood Shores, CA (US)

(72) Inventor: Saurabh Kumar, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 679 days.

(21) Appl. No.: 14/025,853

(22) Filed: Sep. 13, 2013

(65) Prior Publication Data

US 2015/0081730 A1     Mar. 19, 2015

(51) Int. Cl.
*H04L 12/58*     (2006.01)

(52) U.S. Cl.
CPC .................................. *H04L 51/04* (2013.01)

(58) Field of Classification Search
CPC .............. G06F 17/3089; G06F 17/301; G06F 17/30106; G06F 17/30719; G06F 17/30861; G06F 17/30964; G06F 17/30389; G06F 17/30392; G06Q 30/0239; G06Q 30/0277; G06Q 30/02; G06Q 30/0601; Y10S 707/99936; Y10S 707/99933; Y10S 707/99934; Y10S 707/99937; Y10S 707/917; Y10S 707/99935; Y10S 707/99943
See application file for complete search history.

(56) References Cited

U.S. PATENT DOCUMENTS

| | | | |
|---|---|---|---|
| 5,842,196 A * | 11/1998 | Agarwal | .......... G06F 17/30327 |
| 5,978,799 A * | 11/1999 | Hirsch | |
| 6,195,533 B1 | 2/2001 | Tkatch et al. | |
| 6,529,908 B1 * | 3/2003 | Piett | .................. G06F 17/30575 |
| 2002/0002563 A1 * | 1/2002 | Bendik | .......................... 707/500 |
| 2002/0143812 A1 * | 10/2002 | Bedingfield | .................. 707/511 |

(Continued)

FOREIGN PATENT DOCUMENTS

| | | | | |
|---|---|---|---|---|
| CA | | 2333564 A1 * | 12/1999 | ....... G06F 17/30861 |

OTHER PUBLICATIONS

HR Self Service Approving http://www.themis.unimelb.edu.au/resources/IS_HR_Approving.pdf, downloaded circa Feb. 15, 2013, pp. 1-6.

(Continued)

*Primary Examiner* — Augustine K. Obisesan
(74) *Attorney, Agent, or Firm* — IPHorizons PLLC; Narendra Reddy Thappeta

(57) ABSTRACT

According to an aspect multiple records are stored in a database server. A set of records are retrieved by querying the database server. A first file is formed to contain the retrieved set of records. The first file is sent by email to a user, and a second file, with at least one of the set of records modified, is received from the user by email. The received modifications contained in the second file are propagated to the database server, upon receipt of the second file. Users may accordingly be able to effect modifications to multiple records in a single email exchange. According to another aspect, the updates are effected by using a SOA server storing a process definition to interface (send and receive emails) with the user and propagate the changes. The SOA server may contain a workflow block to interact with users based on email exchange.

19 Claims, 11 Drawing Sheets

(56) References Cited

U.S. PATENT DOCUMENTS

| | | | | |
|---|---|---|---|---|
| 2002/0184350 | A1* | 12/2002 | Chen | G06F 8/65 709/221 |
| 2003/0182323 | A1* | 9/2003 | Demsky et al. | 707/203 |
| 2004/0003009 | A1* | 1/2004 | Wilmot | G06F 17/30575 |
| 2004/0133564 | A1* | 7/2004 | Gross et al. | 707/3 |
| 2005/0055386 | A1* | 3/2005 | Tosey | G06F 17/30575 |
| 2006/0059178 | A1* | 3/2006 | Baron | G06F 17/30336 |
| 2006/0129592 | A1* | 6/2006 | Poozhiyil | G06Q 10/107 |
| 2006/0150176 | A1* | 7/2006 | Dorricott | G06F 8/65 717/168 |
| 2007/0208606 | A1* | 9/2007 | Mackay et al. | 705/9 |
| 2007/0219979 | A1* | 9/2007 | Jung | G06F 17/30867 |
| 2008/0155045 | A1* | 6/2008 | Koyama | G05B 23/0213 709/206 |
| 2009/0006477 | A1* | 1/2009 | Oshita | G06F 21/62 |
| 2009/0144266 | A1* | 6/2009 | Bicioglu | 707/5 |
| 2009/0276789 | A1 | 11/2009 | Wu et al. | |
| 2010/0205269 | A1 | 8/2010 | Poozhiyil et al. | |
| 2011/0029625 | A1* | 2/2011 | Cheng et al. | 709/206 |
| 2011/0161913 | A1* | 6/2011 | Garimella et al. | 717/101 |
| 2011/0282707 | A1* | 11/2011 | Rangaswamy et al. | 705/7.26 |
| 2013/0054517 | A1* | 2/2013 | Beechuk | G06F 17/30867 707/609 |

OTHER PUBLICATIONS

Email Approvals, http://www.umdnj.edu/purchweb/words_download/EMAIL_APPROVAL_directions.pdf, downloaded circa Feb. 15, 2013, pp. 1-4.

Requisition/ Purchase Order Email Notifications http://www.finance.upenn.edu/ben/docs/BEN_EMail_PO_Notifications.pdf, downloaded circa Feb. 15, 2013, pp. 1-4.

First Data Global Gateway Connect User manual 1.3, http://www.firstdata.com/downloads/marketing-merchant/fd_globalgatewayconnect_usermanualnorthamerica.pdf , date Sep. 18, 2009, pp. 1-1.

Customizing Notification Message in ActiveRoles Server 6.x, http://communities.quest.com/docs/DOC-10367 , downloaded circa Feb. 18, 2013, pp. 1-8.

Salesforce Limits Quick Reference guide, version 27.0, Spring 13, sales force, date Feb. 8, 2013, pp. 1-43.

Introduction to Human Workflow Services, http://sqltech.cl/doc/oas11gR1/integration.1111/e10224/bp_workflow.htm , downloaded circa Feb. 18, 2013, pp. 1-81.

Exporting Transaction Data for Marketing Automation, http://help.mailup.com/display/mailupUserGuide/Exporting+Transaction+Data+for+Marketing+Automation, downloaded circa Feb. 18, 2013, pp. 1-3.

* cited by examiner

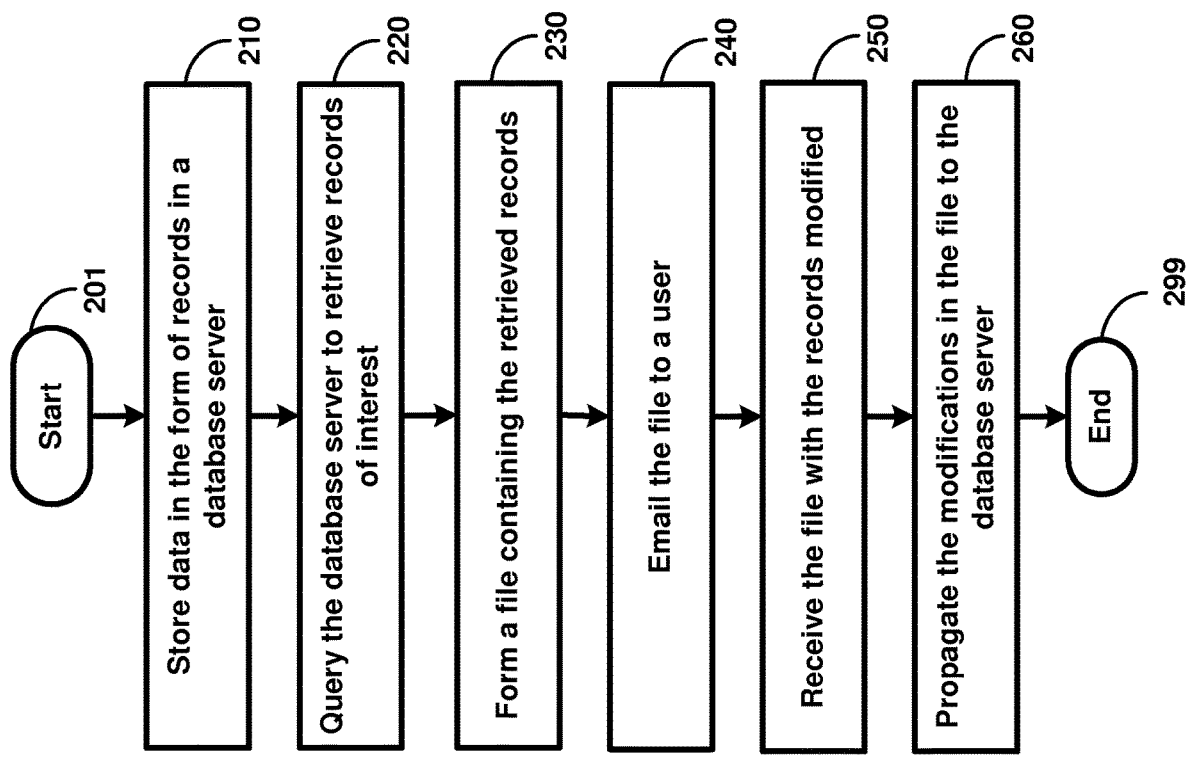

| CREATED_BY | ISSUE_NUMBER | PRIORITY | NEED_BY_DATE | SUMMARY | DESCRIPTION | ISSUE_TYPE_ID | DATE_CREATED | OWNER | ISSUE_STATUS |
|---|---|---|---|---|---|---|---|---|---|
| Connor.Horton | 901 | M | 7/2/2013 | Laptop Problem | Laptop is not starting.Logged SR-103456 | 1 | 6/28/2013 | Kristin.Throm | O |
| Connor.Horton | 903 | M | 8/1/2013 | Unable to login into SSA | Unable to login into self service application. Logged SR-154367 | 2 | 7/11/2013 | Kristin.Throm | O |
| Connor.Horton | 911 | H | 7/19/2013 | Swiping problem | Not able to swipe with my id card | 1 | 7/15/2013 | Jon.Pol | O |
| Connor.Horton | 951 | M | 7/25/2013 | New software request | Visio 2000 need to be installed. Logged SR-161121 | 4 | 7/19/2013 | Jon.Pol | O |
| Susan.Corbet | 902 | M | 7/15/2013 | Issue with Projects Management Application | This could be because of recent web service changes | 2 | 7/3/2013 | Kristin.Throm | O |
| Susan.Corbet | 921 | M | 7/23/2013 | Need to deploy latest code ontio server | We need to deploy latest code to server to reflect our changes. Logged SR-134562 | 3 | 7/17/2013 | Kristin.Throm | O |

*FIG. 4*

| Created By 510 | Issue Number 511 | Priority 512 | Need by Date 513 | Summary 514 | Description 515 | Modify (Y/N) 516 |
|---|---|---|---|---|---|---|
| Connor.Horton | 901 | Medium | 7/2/2013 | Laptop Problem | Laptop is not starting.Logged SR-103456 | N |
| Connor.Horton | 903 | Medium | 8/1/2013 | Unable to login into SSA | Unable to login into self service application. Logged SR-154367 | N |
| Susan.Corbet | 902 | Medium | 7/15/2013 | Issue with Projects Management Application | This could be because of recent web service changes | N |
| Susan.Corbet | 921 | Medium | 7/23/2013 | Need to deploy latest code onto server | We need to deploy latest code to server to reflect our changes. Logged SR-134562 | N |

501 → (row 1), 502 → (row 2), 503 → (row 3), 504 → (row 4)

*FIG. 5B*

```
<IssuesNotificationEvent>
    <ManagerId value="3001000201348761">
    </ManagerId>
    <ManagerName value="Kristin.Throm">
    </ManagerName>
    <ManagerEmail value="Kristin.Throm@xyz.com">
    </ManagerEmail>
    <AttachmentId value="10340501015129O">  } 652
    </AttachmentId>
</IssuesNotificationEvent>
```

*FIG. 6*

| | Created By 810 | Issue Number 811 | Priority 812 | Need by Date 813 | Summary 814 | Description 815 | Modify (Y/N) 816 |
|---|---|---|---|---|---|---|---|
| 801→ | Connor.Horton | 901 | Medium | 7/5/2013 | Laptop Problem SR-103456 | Increased the Need By Date | Y |
| 802→ | Connor.Horton | 903 | Medium | 8/1/2013 | Unable to login into SSA SR-154367 | Please follow up with the Oracle HelpDesk | Y |
| 803→ | Susan.Corbet | 902 | Medium | 7/15/2013 | Issue with Projects Management Application | Need to redeploy Projects Management Application | Y |
| 804→ | Susan.Corbet | 921 | Medium | 7/23/2014 | Need to deploy latest code onto server SR-134562 | We need to deploy latest code to server to reflect our changes. Logged SR-134562 | N |

*FIG. 8*

USE OF EMAIL TO UPDATE RECORDS STORED IN A DATABASE SERVER

BACKGROUND OF THE DISCLOSURE

Technical Field

The present disclosure relates to databases and more specifically to use of email (electronic mail) to update records stored in a database server.

Related Art

A database server permits data to be stored, accessed and modified in the form of structured queries. Structured Query Language (SQL) provides one convention for such queries when a database server stores the data in the form of relational tables. The database server may be viewed as storing records, with each record potentially spanning multiple tables or only a single table.

There is often a need to update records stored in a database. Updating entails changing the value of at least a part of the data constituting the record. For example, if a record represents the data in a row of a table having multiple columns, updating entails storing new values (replacing previous values, if any) in one or more columns of such a row.

Email (electronic mail) offers a convenient communication facility over networks. Typically, a message is composed by a sender and sent to a recipient identified by an email address. The email message is delivered to an email server identified based on the email address of the recipient, and accessed by the recipient from the email server.

At least in view of the widespread availability of email, it may be desirable to facilitate updates to records stored in a database server by email.

BRIEF DESCRIPTION OF THE DRAWINGS

Example embodiments of the present disclosure will be described with reference to the accompanying drawings briefly described below.

FIG. 2 is a flow chart illustrating the manner in which records in a database server are updated using email in an embodiment.

FIG. 4 depicts records in a table of database representing issues raised by team members for various managers, in an embodiment.

FIG. 5B depicts the content of a file created for sending to a manager in an embodiment.

FIG. 6 depicts sample input XML data illustrating the manner the process definition in a SOA server may be invoked for facilitating a manager to specify changes to records of a database, in an embodiment.

FIG. 8 depicts the contents of an email attachment representing the records, as modified, by a manager in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present disclosure provides for management of records. In an embodiment, multiple records are stored in a database server. A set of records are retrieved by querying the database server. A first file is formed to contain the retrieved set of records. The first file is sent by email to a user, and a second file, with at least one of the set of records modified, is received from the user by email. The received modifications contained in the second file are propagated to the database server, upon receipt of the second file.

Users may accordingly be able to effect modifications to multiple records in a single email exchange.

According to another aspect, the updates are effected by using a SOA server storing a process definition to interface (send and receive emails) with the user and propagate the changes. The SOA server may contain a workflow block to interact with users based on email exchange.

According to yet another aspect, the records represent issues raised by members of a team, with each issue required to be reviewed by a corresponding manager. The application server may accordingly retrieve records requiring review by each manager, form a corresponding file for each manager, and request a SOA server to execute the process definition for each manager.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
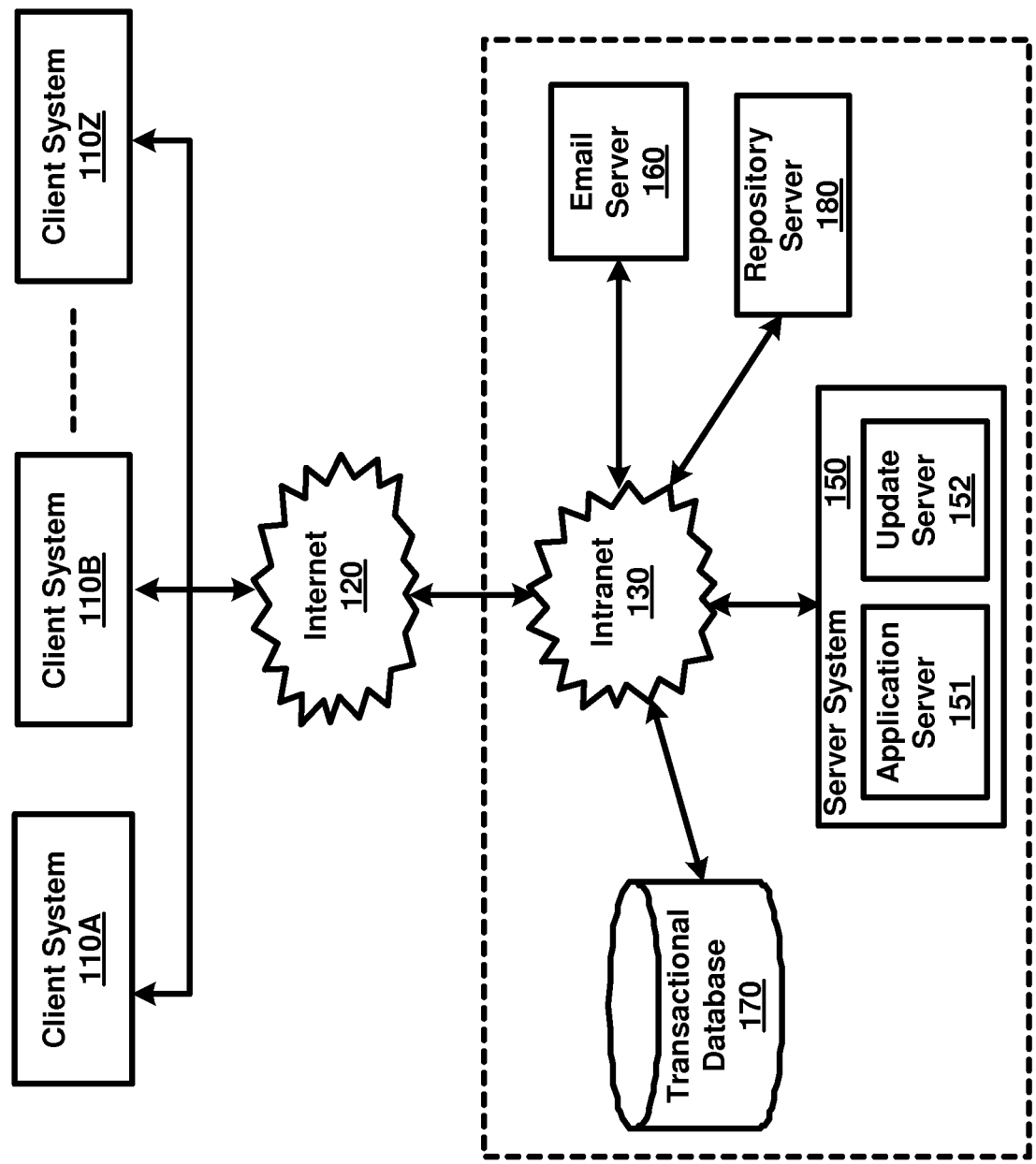
FIG. 1 is a block diagram illustrating an example environment (computing system) in which several aspects of the present disclosure can be implemented.

FIG. 1 is a block diagram illustrating an example environment (computing system) in which several aspects of the present disclosure can be implemented. The block diagram is shown containing client systems 110*a*-110*z*, Internet 120, intranet 130, server system 150, email server 160, transactional database 170 and repository server 180.

Merely for illustration, only representative number/type of systems is shown in FIG. 1. Many environments often contain many more systems, both in number and type, depending on the purpose for which the environment is designed. Each block of FIG. 1 is described below in further detail.

Intranet 130 represents a network providing connectivity between server system 150, email server 160, transactional database 170 and repository server 180, all provided within an enterprise (shown with dotted boundaries). Internet 120 extends the connectivity of these (and other systems of the enterprise) with external systems such as client systems 110A-110Z. Each of intranet 130 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by intranet 130 and Internet 120.

Transactional database 170 represents a database server, and thus contains the database management software and hardware required for storing, accessing and modifying data based on structured queries. It is assumed that transactional database 170 is a relational database containing various tables and records are stored in the respective rows of the tables. Repository server 180 provides for various content management functions such as storing of files and controlling access according to pre-specified policies. Repository server 180 may be implemented using, for example, UCM (Universal Content Management) Product available from Oracle Corporation, the Applicant of the subject patent application.

Email server 160 facilitates sending and receiving of emails from various client systems. It is assumed that the emails can be received at email client software (e.g., Outlook Software from Microsoft Corporation) implemented at various client systems 110A-110Z, and accordingly email server 160 may operate according to protocols such as POP/IMAP, well known in the relevant arts. Similarly, to facilitate client systems to send email messages, email server 160 may provide support for protocols such as SMTP.

Each of client systems 110A-110Z represents a system such as a personal computer, workstation, mobile device, etc., used by users to generate (user) requests directed to applications executing in server system 150. The requests may be generated using appropriate user interfaces. In general, a client system requests an application for performing desired tasks/services (such as accessing a resource hosted by the data center, invoking a service, etc.) and receives corresponding responses containing the results of performance of the requested tasks/services. Client systems 110A-110Z may be used in addition to send/receive email messages (using SMTP/POP/IMAP, noted above) and interact with server system 150 and repository server 180.

Server system 150 is shown containing application server 151 and update server 152. Thus, server system 150 may be implemented as a single digital processing system, or contain respective (physical) server units operating as application server 151 and update server 152. Application server 151 executes applications capable of performing tasks requested by users using client systems 110A-110Z. In response to receiving a client request from a client system, a server performs the tasks specified in the request and sends the result of performance of the tasks to the requesting client system. The server may use data stored internally (for example, in a non-volatile storage/hard disk within the server), external data (for example, in transaction database 170) and/or data received from other sources (e.g., from the user) in performing such tasks. For illustration, it is assumed that at least some of the data generated is stored as records in transaction database 170.

Update server 152, in cooperation with application server and email server 160, operates to enable users at client systems 110A-110Z to update records stored in transactional database 170, as described below with examples.

3. Updating Records in a Database Server

FIG. 2 is a flow chart illustrating the manner in which database records are updated in one embodiment. The steps of the flowchart are described with respect to the specific systems of FIG. 1 merely for illustration. However, the features can be implemented in other systems and environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, server system 150 stores data in the form of records in transactional database 170 (a database server). The data forming the records may be generated (created) in processing various client requests, and stored in transactional database 170 using appropriate SQL statements.

In step 220, server system 150 queries transactional database 170 to retrieve records of interest. In general, the (SQL) query is formulated according to the requirements of the specific environment such that only the data in the relevant rows and columns is ideally retrieved.

In step 230, server system 150 forms a file containing the retrieved records. As is well known in the relevant arts, a file contains data and is suited for storing on secondary storages supporting file systems according to pre-specific conventions (e.g., FAT, NTFS). The files can be selected and suitable actions (such as opening, execution, etc.), depending on the type of the file. In an embodiment described below, the file represents a Spreadsheet file (CSV format), which can be opened by programs such as Excel Spreadsheet from Microsoft Corporation.

In step 240, server system 150 emails the file as an attachment of an email to a user via email server 160. The user may again be determined according to the requirements of the environment. The user may eventually retrieve the first file from a mail server (assumed to be 160, for conciseness), make any desired changes, and send the file back as an email attachment using one client systems 110A-110Z.

In step 250, server system 150 receives the file with the records modified, as an email attachment. The file with the modified records, may be correlated with the corresponding sent file (assuming multiple files of different sources are potentially sent to difference sources for concurrent processing) according to any convention, suitable for the corresponding environment.

In step 260, server system 150 propagates the modifications in the received file to transactional database 170. Specifically, at least the records with the changes are stored in the same rows (identified by some primary key or some other unique identifier) from which the corresponding data is retrieved in step 220.

The flowchart ends in step 299. It may thus be appreciated that a user may be able to make desired updates from locations outside of the enterprise (e.g., where there is no connectivity or access to the corporate databases), in addition to be being able to conveniently change multiple records in a single file.

The description is continued with respect to an example implementation and also a desired output format that can be obtained in accordance with example embodiments of the disclosure.

4. Application Server

Figure 3A:
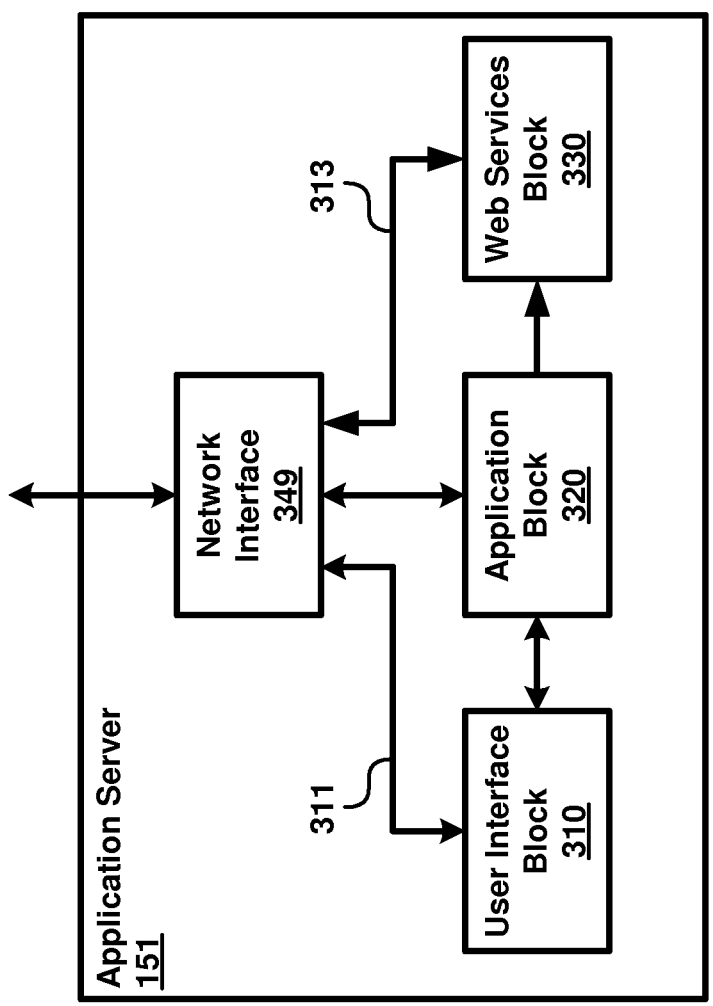
FIG. 3A is a block diagram illustrating the details of an application server in an embodiment.

FIG. 3A is a block diagram illustrating the details of application server 151 in an embodiment. Application server 151 is shown containing user interface block 310, application block 320, web service block 330 and network interface 349. Each block is described below in further detail, assuming that application server 151 operates to enable team members to raise issues requiring review by different managers, and thereafter interact with update server 152 to provide a convenient facility for managers to review/revise the issues.

Network interface 349 provides electrical and protocol interfaces (e.g., network cards, network protocol stacks, etc.) to enable various blocks of application server 151 to communicate via network 120. In general, packets directed to application server 151 are examined for forwarding to the appropriate internal block/application. Similarly, network interface 349 sends packets directed to other external systems (upon receipt of the corresponding packets from the respective block). Network interface 349 may be implemented in a known way.

Web service block 330 implements various web services that can be invoked for a corresponding service. As described below, web services may be implemented to enable update server 152 to retrieve/store files from/in repository server 180, and also to update transactional database 170 with modifications to records received from a manager. The implementation of such web services will be apparent to one skilled in the relevant arts by reading the disclosure provided herein.

User interface block 310 provides a convenient user interface using which users may interact with application server 151. In an embodiment, user interface block 310 is implemented using a web application that serves HTML pages. The substantive content of the served web pages may be provided by application block 320. User interface block 310 forwards the content in received web pages to application block 320.

Application block 320 implements a user application using which records may be created and manipulated. Thus, application block 320 may interface with user interface block 310 to serve web pages and receive appropriate content, that forms the basis for creation of such records in transactional database 170. The records may represent issues raised by team members using client systems 110A-110Z.

In addition, application block 320 retrieves from transactional database 170 records representing records that are to be reviewed by each manager (forming the records of interest for the corresponding manager), and forms a file in CSV format containing the retrieved records. The file is stored in repository server 180 with a unique identifier (created by repository server 180), and application block 320 interacts with update server 152 to enable the manager to modify the corresponding records. The operation of application block 320 to initiate such actions (for facilitating each manager to modify corresponding records) may be triggered periodically (e.g., mid-night before each business day). The operation of update server 152 is illustrated below with examples.

5. Update Server

Figure 3B:
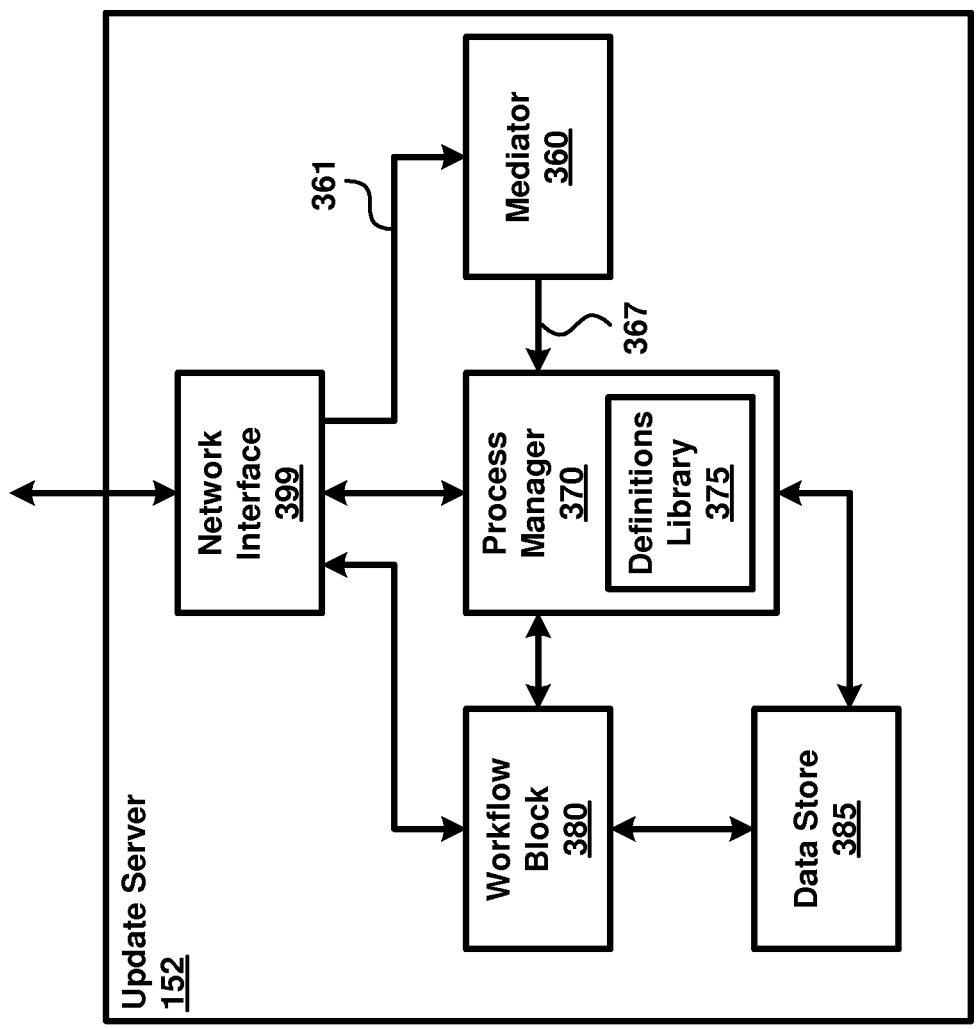
FIG. 3B is a block diagram illustrating the details of an update server in an embodiment.

FIG. 3B is a block diagram illustrating the details of update server 152 in an embodiment. Update server 152 is shown containing mediator 360, process manager 370, definitions library 375, workflow block 380, data store 385, and network interface 399. Each of the blocks is described in detail below assuming that update server 152 is implemented as a SOA (Service Oriented Architecture) server, though other technologies can be used for implementing update server 152.

Network interface 399 is implemented similar to 349 described above with respect to FIG. 3A, and the description is not repeated in the interest of conciseness. Data store 385 represents an internal memory (hardware) for storing/buffering various data and status information as described below.

Definitions library 375 stores the individual process definitions to be executed by process manager 370. Each process definition typically contains multiple tasks, some of which require human interaction, and some may be executed conditionally, etc. Each process definition may be specified according to languages such as Business Process Execution Language (BPEL), as is well known in the relevant arts.

Mediator 360 operates to validate each received message (e.g., to confirm that one of the service components of update server 152 is the recipient, the message content is consistent with the required syntax and semantics, etc.), and routes the message to an appropriate component recipient within update server 152. Workflow block 380 and process manager 370 represent such components, though the communication path is shown only to process manager 370, as relevant to the illustrative example. Mediator 360 may transform received message into a format suitable by processing of the corresponding recipient component. In an embodiment, mediator 360 may subscribe to events triggered by application block 320 in relation to issue resolution, and accordingly receive the corresponding messages.

Workflow block 380 is designed specifically for execution of tasks that require human interaction. In particular, workflow block 380 receives a request to send an email to a manager, with a file as an attachment. The email-identifier of the manager and the attachment may be received according to any suitable convention. Workflow block 380 sends an email (with file attachment) as requested, and may store status information in data storage 385 for correlation of sent message with reply email to be received later. Workflow block 380 receives an attachment with the reply email. The reply email may be correlated to an earlier sent email based on identifiers such as unique numbers inserted into the subject line or content of the email. The received attachment is provided to process manager 370, as a response to the previously received email. Data store 385 may be used as a buffer for communicating the attachments of the two email messages between process manager 370 and workflow block 380.

Process manager 370, executes a process definition upon receipt of a message requesting execution of the process definition. Each received message may contain an identifier of a process definition, and the process definition having a matching identifier in definitions library 375 may be identified and executed. The manner in which process manager 370 may execute one of the process definitions to facilitate a manager to conveniently modify records representing issues, is described below with examples.

6. Example Illustration

FIG. 4 depicts content of table (ISSUE) stored in transactional database 170. The table is assumed to store issues entered by team members using client systems 110A-110Z. Each row of the table represents an issue entered by a team member.

CREATED_BY column 410 specifies team member who has entered the issue. ISSUE_NUMBER column 411 uniquely identifies an issue. PRIORITY column 412 specifies priority of the issue. Priority can be high (H), medium (M) or low (L). NEED_BY_DATE column 413 specifies date by when the issue need to be resolved. SUMMARY column 414 describes an issue in concise manner. DESCRIPTION column 415 describes an issue in details.

ISSUE_TYPE_ID column 416 identifies the type of the issue. Issues are categorized in multiple types. For example, types can be hardware issue, internal application issue or deployment issue. DATE_CREATED column 417 specifies date on which team member has entered the issue. OWNER column 418 specifies the manager responsible for reviewing that issue. ISSUE_STATUS column 419 specifies current status of an issue. Status can be open (O) or closed (C).

As may be readily observed rows 401-404 are created by one team member, while rows 405 and 406 are created by another team member. Similarly, different managers are responsible for reviewing the issues represented by some of the rows.

As noted above, application block 320 creates a file containing the respective records to be reviewed by each of the managers. Accordingly, the mapping information of FIG. 5A may be maintained to indicate the relationship between the columns of the database tables (assumed to be a single table here, for illustration) and a spreadsheet (CSV) file. Thus, 'CREATED_BY' column of ISSUE table is shown mapped to 'Created By' Column of a CSV file. The remaining columns 411-415 of database table are mapped to corresponding column of CSV file, as shown in FIG. 5A.

Figure 5A:
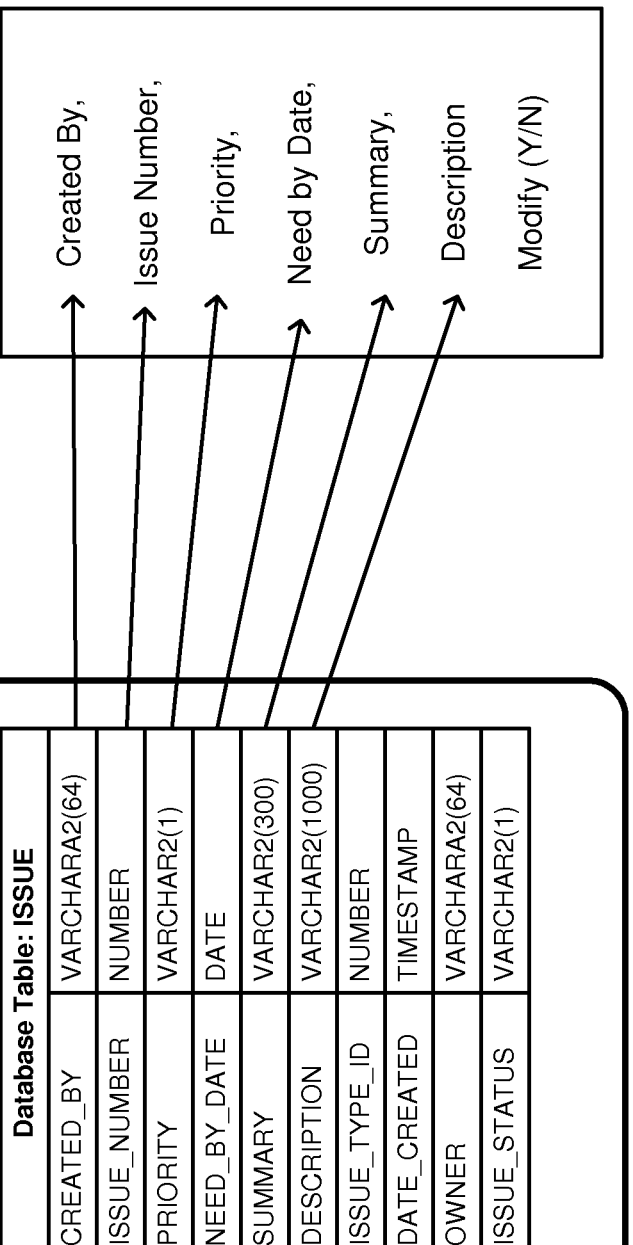
FIG. 5A depicts a mapping indicating the association between the columns of a table in a database, and the columns of a spreadsheet file in an embodiment.

FIG. 5B depicts content of a spreadsheet (CSV) file created for a manager named Kristin Throm in accordance with the data of FIG. 4 and mapping of FIG. 5A. Application block 320 may retrieve the relevant records from the table of FIG. 4 using an appropriate SQL query and form a file, as shown in FIG. 5B. The relevant records may be retrieved by issuing a query directed to the ISSUE table with a condition in which OWNER is a specific manager and ISSUE_STATUS is O (open). Issue number 511 represents a primary key which uniquely identifies each record, and thus the column may be protected from being modified by managers.

FIG. 5B further shows modify column 516 added to spreadsheet with initial value as N. As will be clear from the description below, a manager changes the value in that row to Y, to indicate that the corresponding row data has been modified by the manager. Application block 320 stores the file of FIG. 5B on repository server 180 and initiates a process using update server 152, as described below.

7. Operation of Update Server

FIG. 6 depicts sample input XML data sent by application block 320 to update server 152 to facilitate a manager to review and possibly modify issues assigned to the manager. As may be readily observed, the message there indicates a unique identifier of an attachment (representing the file of FIG. 5B) at repository server 180 and the email identifier of the recipient manager. The unique identifier may be obtained from repository server 180 upon storing of the file. It is assumed that the message need not be further transformed, and thus the same message may be forwarded by mediator 360 to process manager 370.

Figure 7:
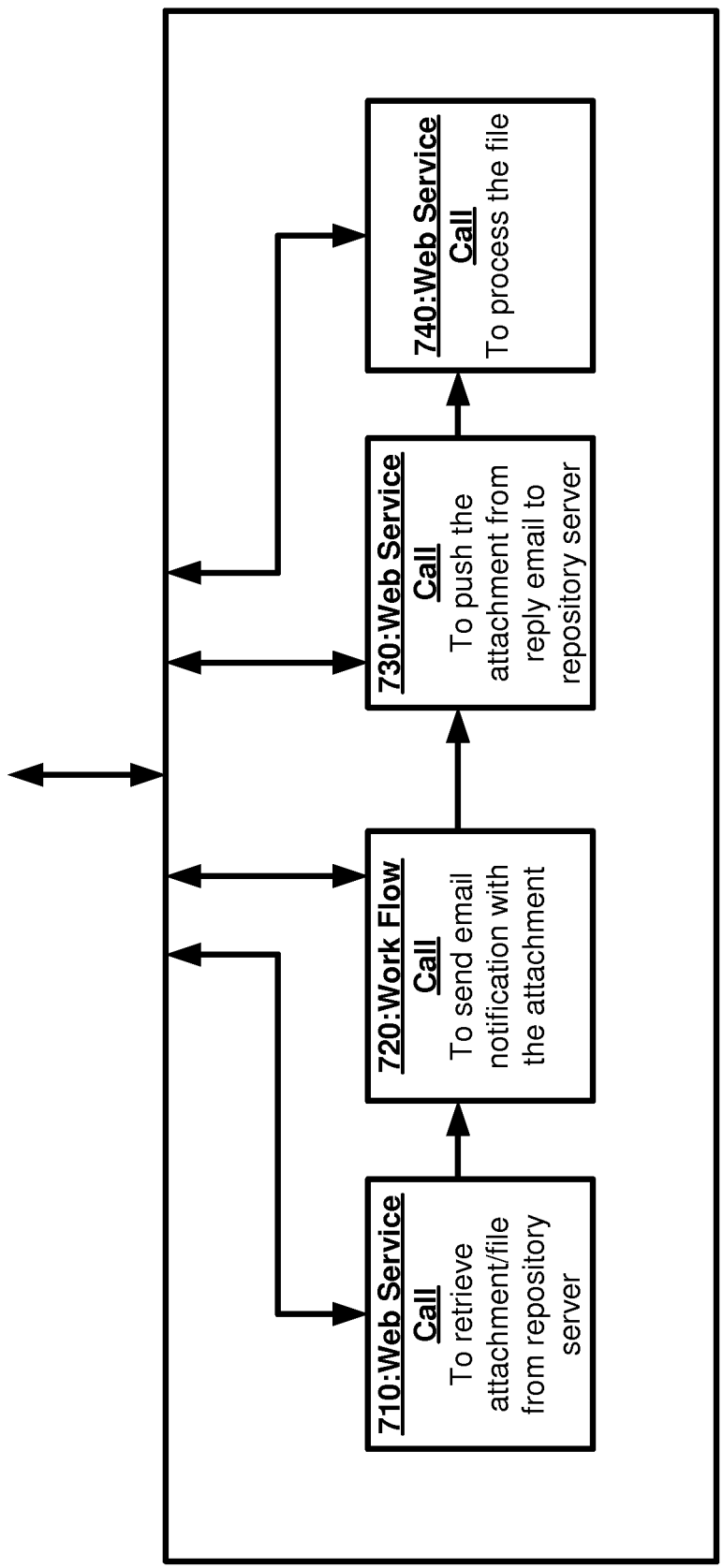
FIG. 7 depicts a process definition in a SOA server for enabling a manager to indicate changes to records in an email attachment, in an embodiment.

FIG. 7 depicts a process definition executed by a process manager in an embodiment. The specific process definition (among those in definitions library 375) to be processed is identified by the corresponding tag IssuesNotificationEvent in the received message. Though shown as block/flow diagram for ease of understanding, the definition may be stored in accordance with Business Process Execution Language (BPEL).

Process manager 370, to process task 710, retrieves a file identified by tag AttachmentId from repository server 180 using a web service implemented in web services block 330. Process manager 370 generates a unique (transaction) identifier for each of the received messages.

Process manager 370, to process task 720, thereafter invokes workflow block 380, passing the retrieved file and the transaction identifier as respective parameters. Workflow block 380 forms an email with the file as an attachment, incorporates the unique transaction identifier in the subject line (or content), and sends the email to a recipient identified by tag ManagerEmail (in the input XML data/message).

Workflow block 380 thereafter receives an email response with the subject line (or content), containing the transaction identifier. The email response contains an attachment, with any modifications made by the manager. Workflow block 380 stores the file in data store 385 with another file identifier (ReplyAttachmentId), and notifies process manager 370 of the availability of the email response (with the file identifier as a parameter).

FIG. 8 contains the modified file (corresponding to that shown in FIG. 5B). As shown there, rows 801-803 are shown modified (column 816 is set to Y), while row 804 is left unmodified (column 816 is set to N).

Process manager 370, to process task 730, stores the received file (available in data store 385) in repository server 180 by invoking a web service implemented in web services block 330. The file may replace (or be stored in association with) the original file (of FIG. 5B) identified by AttachmentId (652 of FIG. 6). Several such files may be stored while processing corresponding messages, and the changes in all such files may be propagated at a convenient time by task 740.

Process manager 370, to process task 740, fetches the file from repository server 180, using a web service and calls 'update database' web service implemented in web service block 330. 'Update database' web service parses the received spreadsheet file for rows marked with Y in column 816. The 'update database' web service then updates the corresponding database records using appropriate SQL statements.

Thus, the data in rows 801-803 replaces the corresponding data in rows 401, 402 and 405 (with each corresponding row identified by the corresponding issue number), thereby facilitating a manager to modify the records in transactional database 170 using email. Accordingly, the manager can review the issues even from locations where there is no secure (e.g., corporate VPN) connection to the corporate network, and in addition change multiple records in a single email conveniently.

It should be further appreciated that the features described above can be implemented in various embodiments as a desired combination of one or more of hardware, software,

8. Digital Processing System

Figure 9:
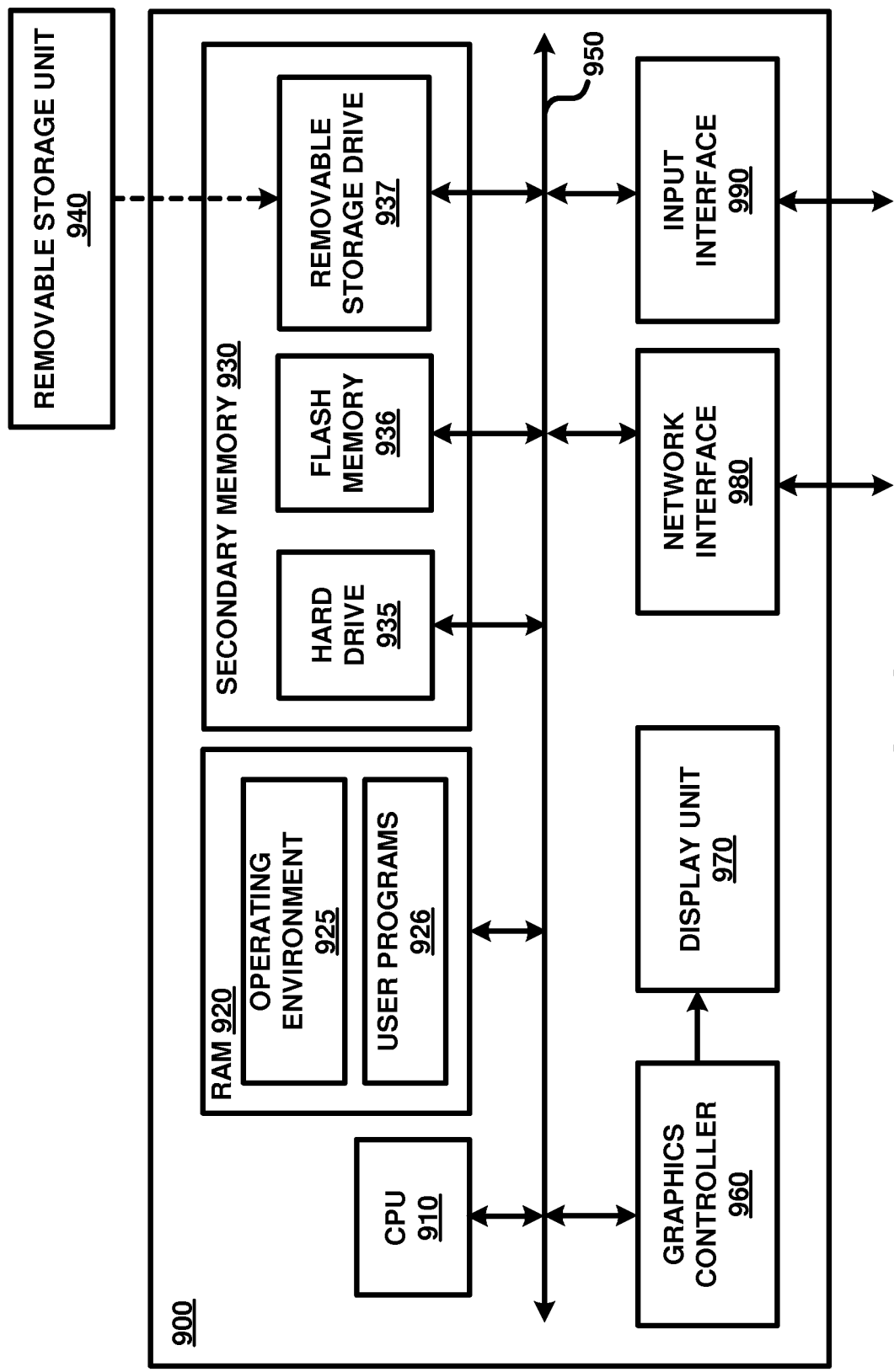
FIG. 9 is a block diagram illustrating the details of a digital processing system in which several aspects of the present disclosure are operative by execution of appropriate software instructions.

FIG. 9 is a block diagram illustrating the details of digital processing system 900 in which various aspects of the present disclosure are operative by execution of appropriate software instructions. Digital processing system 900 may correspond to server system 150, application server 151 or update server 152.

Digital processing system 900 may contain one or more processors such as a central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present disclosure. CPU 910 may contain multiple processing units, with each processing unit potentially being designed for a specific task. Alternatively, CPU 910 may contain only a single general-purpose processing unit.

RAM 920 may receive instructions from secondary memory 930 using communication path 950. RAM 920 is shown currently containing software instructions constituting shared environment 925 and/or user programs 926 (such as client applications, Web browser, and some of the blocks of FIGS. 3A/3B, etc.). Shared environment 925 includes operating systems, device drivers, virtual machines, RDBMS, process manager 370, etc., which provide a (common) run time environment for execution of user programs 926.

Graphics controller 960 generates display signals (e.g., in RGB format) to display unit 970 based on data/instructions received from CPU 910. Display unit 970 contains a display screen to display the images defined by the display signals. Input interface 990 may correspond to a keyboard and a pointing device (e.g., touch-pad, mouse) and may be used to provide inputs. Network interface 980 provides connectivity to a network (e.g., using Internet Protocol), and may be used to communicate with other systems (such as those shown in FIG. 1) connected to the network.

Secondary memory 930 may contain hard drive 935, flash memory 936, and removable storage drive 937. Secondary memory 930 may store the data software instructions (e.g., for performing the actions noted above with respect to FIG. 2), which enable digital processing system 900 to provide several features in accordance with the present disclosure.

Some or all of the data and instructions may be provided on removable storage unit 940, and the data and instructions may be read and provided by removable storage drive 937 to CPU 910. Floppy drive, magnetic tape drive, CD-ROM drive, DVD Drive, Flash memory, removable memory chip (PCMCIA Card, EEPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 930. Volatile media includes dynamic memory, such as RAM 920. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 950. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of managing records, said method comprising:
   storing a plurality of records in a database server, wherein said plurality of records includes a first record containing a first column set to a first data value;
   issuing a first structured query directed to said database server to retrieve a set of records of interest, wherein said query specifies a condition and wherein each of said set of records satisfies said condition, wherein said set of records includes said first record with said first data value;
   forming a first file by incorporating into said first file, said set of records retrieved from said database server, wherein each of said set of records, including said first record with said first data value, is incorporated into said first file after being retrieved from said database server;
   sending said first file, containing said set of records, by email to a user;
   receiving a second file, with at least one of said set of records modified, by email from said user, wherein said second file indicates a second data value for said first column of said first record,
   wherein said second file contains a respective additional field for each of said set of records, wherein the additional field indicates whether the corresponding record has been modified or not, wherein the additional field for said first record indicates that said first record has been modified;
   parsing said second file to determine the specific records of said set of records which are indicated by the respective additional fields as having been modified; and
   propagating the modifications contained in said second file to said database server, upon receipt of said second file, wherein said propagating comprises issuing a second structured query directed to said database server to update said at least one of said set of records,
   wherein said second structured query is designed to update only said specific records in said database server,
   wherein said first data value for said first column is replaced by said second data value in said database server due to execution of said second structured query in said database server.

2. The method of claim 1, wherein said first file is sent as a corresponding attachment to said email sent to said user, and said second file with modifications is received as a corresponding attachment to said email received from said user.

3. The method of claim 1, wherein each of said first structured query and said second structured query is according to SQL (structured query language),
   said database server containing a plurality of tables, each table containing a plurality of rows,
   each of said plurality of records being stored as a respective row of a corresponding table,
   said first structured query according to said SQL specifying said condition such that the rows of data in said plurality of tables satisfying said condition constitute said set of records of interest retrieved from said database server,
   said second structured query according to said SQL causing update of a row storing said at least one of said set of records.

4. The method of claim 3, further comprising:
   maintaining, a process definition containing a set of tasks, wherein said set of tasks include interfacing with said user, and said propagating; and
   receiving a request to execute said process definition, said request specifying said first file and said user as parameters such that said first file is sent to said user by email.

5. The method of claim 4, wherein a process manager executes said process definition in response to receiving of said request,
   said process manager being contained in a SOA (Service Oriented Architecture) server and said process definition being specified according to Business Process Execution Language (BPEL),
   said process manager invoking a human workflow block to perform said sending and said receiving.

6. The method of claim 5, wherein said plurality of records correspond to issues raised by members of a team, and wherein said condition comprises specifying a manager who is to process the issues as a next step, said user comprising said manager such that said first file contains only issues that are to be processed by said manager,
   wherein said issuing, said forming and said sending of said first file are performed periodically,
   said set of records being provided as respective rows in said first file and each row containing a set of columns, wherein said modifications comprise changes made by said manager to data in said set of records in said first file, and
   wherein modifications performed to said first file are propagated to said database server by execution of said process definition.

7. The method of claim 1, wherein said plurality of records includes a second record with a third data value for said first column in said database server,
   wherein said second record with said third data value is retrieved as a part of said set of records and incorporated into said first file sent to said user,
   wherein said second file indicates said third data value for said first column of said second record,
   wherein said second structured query is designed to update said first record but not said second record in said database server in view of change of data value of said first record but not said second record.

8. A computing system comprising:
   a database server;
   an application server to populate said database server with a plurality of records, wherein said plurality of records includes a first record containing a first column set to a first data value,
   wherein said application server is operable to issue a first structured query directed to said database server to retrieve a set of records as being of interest, wherein said query specifies a condition and wherein each of said set of records satisfies said condition, wherein said set of records includes said first record with said first data value,
   said application server further operable to form a first file by incorporating said set of records into said first file, wherein each of said set of records, including said first record with said first data value, is incorporated into said first file after being retrieved from said database server; and
an update server operable to:
send said first file containing said set of records by email to a user, said set of records being contained in said plurality of records;
receive a second file, with at least one of said set of records modified, by email from said user, wherein said second file indicates a second data value for said first column of said first record,
wherein said second file contains a respective additional field for each of said set of records, wherein the additional field indicates whether the corresponding record has been modified or not, wherein the additional field for said first record indicates that said first record has been modified;
parsing said second file to determine the specific records of said set of records which are indicated by the respective additional fields as having been modified; and
propagate the modifications contained in said second file to said database server, upon receipt of said second file, wherein to said propagate, said update server issues a second structured query directed to said database server to update said at least one of said set of records,
wherein said second structured query is designed to update only said specific records in said database server,
wherein said first data value for said first column is replaced by said second data value in said database server due execution of said second structured query in said database server.

9. The computing system of claim 8, further comprising a repository server,
said application server being operable to store said first file in said repository server and to generate a request to said update server to cause said update server to perform said send of said first file,
wherein each of said first structured query and said second structured query is according to SQL (structured query language),
said database server containing a plurality of tables, each table containing a plurality of rows, each of said plurality of records being stored as a respective row of a corresponding table,
said first structured query according to said SQL specifying said condition such that the rows of data in said plurality of tables satisfying said condition constitute said set of records of interest retrieved from said database server, said set of records being provided as respective rows in said first file and each row containing a set of columns,
said second structured query according to said SQL causing update of a row storing said at least one of said set of records.

10. The computing system of claim 9, wherein said update server is a Service Oriented Architecture (SOA) server storing a process definition specified in Business Process Execution Language (BPEL), said process definition specifying interfacing with said user and said propagate as respective tasks,
said update server being operable to receive a request to execute said process definition, and to execute said process definition in response to receipt of said request.

11. The computing system of claim 10, wherein said update server is operable to store said second file also in said repository server, wherein said update server retrieves said second file from said repository server in performing said propagate.

12. The computing system of claim 11, wherein said application server is designed to facilitate members of a team to raise respective issues, each issue requiring review by a corresponding manager as a next step,
said application server retrieving issues to be reviewed by a specific manager as said first set of issues, wherein said user is said specific manager.

13. The computing system of claim 12, wherein said application server generates said request after storing said first file in said repository,
said application server specifying an identity of said user and an identity of said first file in said repository as parameters to said request, causing said update server to send said first file to said user.

14. A non-transitory machine readable medium storing one or more sequences of instructions for causing a server system to manage records, wherein execution of said one or more sequences of instructions by one or more processors contained in said server system causes said server system to perform the actions of:
issuing a first structured query directed to a database server to retrieve a set of records of interest, wherein said query specifies a condition and wherein each of said set of records satisfies said condition, wherein said set of records includes a first record containing a first column set to a first data value in said database server;
forming a first file by incorporating into said first file, said set of records retrieved from said database server, wherein each of said set of records, including said first record with said first data value, is incorporated into said first file after being retrieved from said database server;
sending said first file, containing said set of records, by email to a user;
receiving a second file, with at least one of said set of records modified, by email from said user, wherein said second file indicates a second data value for said first column of said first record,
wherein said second file contains a respective additional field for each of said set of records, wherein the additional field indicates whether the corresponding record has been modified or not, wherein the additional field for said first record indicates that said first record has been modified;
parsing said second file to determine the specific records of said set of records which are indicated by the respective additional fields as having been modified; and
propagating the modifications contained in said second file to said database server, upon receipt of said second file, wherein said propagating comprises one or more instructions for issuing a second structured query directed to said database server to update said at least one of said set of records,
wherein said second structured query is designed to update only said specific records in said database server,
wherein said first data value for said first column is replaced by said second data value in said database server due to execution of said second structured query in said database server.

15. The non-transitory machine readable medium of claim 14, wherein said first file is sent as a corresponding attachment to said email sent to said user, and said second file with modifications is received as a corresponding attachment to said email received from said user.

16. The non-transitory machine readable medium of claim 14, wherein each of said first structured query and said second structured query is according to SQL (structured query language), said database server containing a plurality of tables, each table containing a plurality of rows, each of said plurality of records being stored as a respective row of a corresponding table, said first structured query according to said SQL specifying said condition such that the rows of data satisfying said condition constitute said set of records of interest retrieved from said database server, said second structured query according to said SQL causing update of a row storing said at least one of said set of records.

17. The non-transitory machine readable medium of claim 16, the actions further comprising:

maintaining, a process definition containing a set of tasks, wherein said set of tasks include interfacing with said user, and said propagating; and receiving a request to execute said process definition, said request specifying said first file and said user as parameters such that said first file is sent to said user by email.

18. The non-transitory machine readable medium of claim 17, wherein a process manager executes said process definition in response to receiving of said request, said process manager being contained in a SOA (Service Oriented Architecture) server and said process definition being specified according to Business Process Execution Language (BPEL), said process manager invoking a human workflow block to perform said sending and said receiving.

19. The non-transitory machine readable medium of claim 18, wherein said plurality of records correspond to issues raised by members of a team, and wherein said condition comprises specifying a manager who is to process the issues as a next step, said user comprising said manager such that said first file contains only issues that are to be processed by said manager, wherein said issuing, said forming and sending of said first file are performed periodically, said set of records being provided as respective rows in said first file and each row containing a set of columns, wherein said modifications comprise changes made by said manager to data in said set of records in said second file, and wherein modifications performed to said first file are propagated to said database server by execution of said process definition.

* * * * *

UNITED STATES PATENT AND TRADEMARK OFFICE
CERTIFICATE OF CORRECTION

PATENT NO. : 10,536,404 B2
APPLICATION NO. : 14/025853
DATED : January 14, 2020
INVENTOR(S) : Kumar Page 1 of 1

It is certified that error appears in the above-identified patent and that said Letters Patent is hereby corrected as shown below:

In Column 13, Line 34, in Claim 8, after "due" insert -- to --.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*